(12) United States Patent
Lv et al.

(10) Patent No.: US 9,742,031 B2
(45) Date of Patent: Aug. 22, 2017

(54) LITHIUM BATTERY AND THE PREPARATION METHOD THEREOF

(71) Applicant: EVE Energy Co., Ltd., Huizhou, Guangdong (CN)

(72) Inventors: Zhengzhong Lv, Guangdong (CN); Fanfen Liu, Guangdong (CN); Zhongzhi Yuan, Guangdong (CN); Jincheng Liu, Guangdong (CN)

(73) Assignee: EVE Energy Co., Ltd., Huizhou, Guangdong (CN)

( * ) Notice: Subject to any disclaimer, the term of this patent is extended or adjusted under 35 U.S.C. 154(b) by 200 days.

(21) Appl. No.: 14/384,178

(22) PCT Filed: Jan. 28, 2014

(86) PCT No.: PCT/CN2014/071643
§ 371 (c)(1),
(2) Date: Sep. 10, 2014

(87) PCT Pub. No.: WO2015/096272
PCT Pub. Date: Jul. 2, 2015

(65) Prior Publication Data
US 2015/0288029 A1    Oct. 8, 2015

(30) Foreign Application Priority Data

Dec. 27, 2013 (CN) .......................... 2013 1 0747196

(51) Int. Cl.
*H01M 10/0567* (2010.01)
*H01M 10/0525* (2010.01)
(Continued)

(52) U.S. Cl.
CPC ..... *H01M 10/0567* (2013.01); *H01M 2/1686* (2013.01); *H01M 4/131* (2013.01);
(Continued)

(58) Field of Classification Search
CPC .......... H01M 10/052; H01M 10/0567; H01M 10/0525; H01M 2/16; H01M 2/1686;
(Continued)

(56) References Cited

U.S. PATENT DOCUMENTS

2013/0302700 A1* 11/2013 Washizuka ........ H01M 10/0525
429/331
2015/0037690 A1* 2/2015 Dalavi .............. H01M 10/0567
429/331

FOREIGN PATENT DOCUMENTS

CN    101145608 A    3/2008
CN    101662046 A    3/2010
(Continued)

OTHER PUBLICATIONS

International Search Report from International Patent Application No. PCT/CN2014/071643, dated Aug. 20, 2014.

*Primary Examiner* — Karie O'Neill Apicella
(74) *Attorney, Agent, or Firm* — Andrus Intellectual Property Law, LLP (57) ABSTRACT

The present invention discloses a lithium battery, which comprises of a positive electrode plate, a negative electrode current collector substrate, a separator and electrolyte between the positive electrode plate and the negative electrode current collector substrate. The positive electrode plate comprises a positive electrode collector, a positive electrode active material-containing positive electrode layer attached to the positive electrode collector and positive electrode tab welded to the positive electrode collector. The negative electrode current collector substrate comprises a negative electrode current collector and negative electrode tab welded to the negative electrode current collector. The negative electrode current collector substrate is a current collector substrate with 6~60 μm thickness having a planar or concavo-convex structure which is made from metal foil mate-
(Continued)

rial or metal mesh with 6~25 μm thickness. The electrolyte contains lithium salt and solvent, wherein the lithium salt is lithium hexafluorophosphate and its concentration in the electrolyte is between 1.5~7 mol/L. The lithium battery of the present invention has characteristics of high power, high energy and low self-discharge rate. Meanwhile, the present invention also discloses a preparation method of the lithium battery and use thereof.

15 Claims, 3 Drawing Sheets

(51) Int. Cl.
*H01M 2/16* (2006.01)
*H01M 4/66* (2006.01)
*H01M 4/131* (2010.01)
*H01M 4/505* (2010.01)
*H01M 4/525* (2010.01)
*H01M 10/058* (2010.01)
*H01M 4/74* (2006.01)
*H01M 10/0568* (2010.01)

(52) U.S. Cl.
CPC ............ *H01M 4/505* (2013.01); *H01M 4/525* (2013.01); *H01M 4/661* (2013.01); *H01M 4/74* (2013.01); *H01M 10/058* (2013.01); *H01M 10/0525* (2013.01); *H01M 10/0568* (2013.01); *H01M 2220/30* (2013.01); *H01M 2300/0028* (2013.01)

(58) Field of Classification Search
CPC ...... H01M 4/131; H01M 4/505; H01M 4/525; H01M 4/66; H01M 4/661
USPC .................. 429/200, 331–332, 326, 338, 342
See application file for complete search history.

(56) References Cited

FOREIGN PATENT DOCUMENTS

| | | |
|---|---|---|
| CN | 102150315 A | 8/2011 |
| CN | 202259533 U | 5/2012 |
| CN | 103137942 A | 6/2013 |
| CN | 103456994 A | 12/2013 |

* cited by examiner

LITHIUM BATTERY AND THE PREPARATION METHOD THEREOF

TECHNOLOGY FIELD

This invention belongs to the field of lithium battery technology, particularly relates to a lithium battery with high-power, high-energy, low self-discharge rate and to the preparation method thereof.

BACKGROUND ART

In recent years, with the development of technology, the function of electronic devices is upgraded continuously. Therefore, the demand for the energy and rate capability properties of lithium battery is increasing. High energy lithium battery has become a research focus in the battery industry.

Lithium battery is classified into primary lithium battery (primary battery) and lithium-ion battery (secondary battery). Relatively, the lithium primary battery has a higher energy density, mainly because the used lithium metal negative electrode has a higher theoretical capacity per gram compared with the carbon-based negative electrode used in the lithium-ion battery. Specifically, the theoretical capacity per gram of the lithium metal negative electrode is 3860 mAh/g, while the theoretical capacity per gram of the carbon-based negative electrode is 372 mAh/g. In addition, there will occur a side reaction in the positive/negative electrode material of the lithium-ion battery during charging and discharging, leading to the generation of an irreversible capacity. Furthermore, during the first charging of a lithium-ion battery, the carbon-based negative electrode will react with electrolyte at the solid-liquid interface and a solid electrolyte interface film (SEI layer) will be formed. This procedure will lead to the loss of part of positive electrode capacity. Based on the above two points, the capacity utilization rate of a conventional lithium-ion battery material is about 90%. In addition, the lithium-ion battery has a higher self-discharge rate while the lithium primary battery has a lower one; the defect of the lithium primary battery is its output power is lower compared with the lithium-ion battery. This is mainly because the lithium primary battery is generally obtained in two ways: one is to increase energy density by increasing the conductivity of the electrode itself, while this is not feasible for the lithium primary battery; the other is to make the electrode to be very thin, however, since metal lithium itself has a low tension strength, the thin lithium plate tends to break during the battery preparation process. In contrary, the negative electrode of lithium-ion battery is made using carbon-based material which itself has a high conductivity capacity to coat on a current collector (e.g. copper foil), thereby the thickness of the electrode plate is controllable to meet the requirement of power.

Based on the description above, the current research on lithium battery is mainly focused on improving the energy density of primary battery and increasing the energy density of the chargeable lithium-ion battery. There are two ways to increase the tension strength of the metal lithium cathode for the primary lithium battery with high power: one way is to increase the mechanical strength by increasing the thickness of the metal lithium in the negative electrode and the other is to increase its mechanical tension strength by adding metal lithium to a thin conductive support component such as metal mesh or metal tape in the manner of spraying or compression.

The first way significantly reduces the utilized portion of the lithium metal negative electrode and lowers the energy density of the battery; furthermore, the lithium metal negative electrode is larger than necessary, which creates a huge potential safety hazard. In the second way, the operation of spraying and compression has to be done in a dry area or an atmosphere that is inert to lithium metal, such as nitrogen or argon. Therefore, the cost of the preparation is high, the preparation procedure becomes complicated, and it is hard to achieve a continual production and to guarantee the uniformity of the negative electrode plate.

One direction of high energy lithium-ion battery research is to develop lithium-ion battery negative electrode materials with high-capacity, including nitrides, silicon-based materials, tin-based materials, etc. The size of such negative electrode materials will increase during the charging and discharging because of the embedding of the lithium ions, however, the volume cannot be restored to its original state after the lithium ions are extracted, which result in volume swelling of the battery, chalking of the electrode and loss of electrochemical activity, thus leading to loss of the capacity and a huge potential safety hazard.

SUMMARY OF THE INVENTION

The object of the present invention is to overcome the drawback in the art and to provide a lithium battery with high power, high energy and low self-discharge rate. Another object of the present invention is to provide a preparation method of the lithium battery. The object of the present invention is also to provide use of the lithium battery in electronic devices.

To achieve the above goal, the present invention employs the following technical solution:
a lithium battery, which comprises a positive electrode plate, a negative electrode current collector substrate, the separator and electrolyte between the positive electrode plate and the negative electrode current collector substrate, wherein,
the positive electrode plate comprises a positive electrode collector, a positive electrode active material-containing positive electrode layer attached to the positive electrode collector and positive electrode tab welded to the positive electrode collector;
the negative electrode current collector substrate comprises a negative electrode current collector and negative electrode tab welded to the negative electrode current collector;
the negative electrode current collector substrate is a current collector substrate with 6~60 μm thickness having a planar or concavo-convex structure which is made from metal foil material or metal mesh with 6~25 μm thickness; and
the electrolyte contains lithium salt and solvent, wherein the lithium salt is lithium hexafluorophosphate and its concentration in the electrolyte is between 1.5 and 7 mol/L.

The above-mentioned metal foil material or metal mesh having a planar or concavo-convex structure is made into the negative electrode current collector substrate by roller press or molding press.

The negative electrode of the lithium battery of the present invention is the metal foil material or metal mesh having a planar or concavo-convex structure as a current collector. During the charging, lithium in the positive electrode active material is extracted and deposits on the negative electrode current collector to form the metal lithium negative electrode active material. Meanwhile, by the manner of charging, the lithium in the positive electrode material is made to be extracted to form the positive electrode active material, thereby the negative current collector substrate is coated with a thin metal lithium coating in the manner of plating during the charging, saving the space of the lithium battery and increasing its energy density and power density. Meanwhile, the metal foil material or metal mesh with a planar or concavo-convex structure will provide a space for the current collector to stretch and also provide an electrolyte-reserved space, avoiding the breakage of the positive and negative electrode current collectors induced by lithium-plating volume expansion of negative electrode current collector and increasing the reserved volume of the electrolyte at the same time. Compared with the existing conventional electrolyte system, the electrolyte of the lithium battery of the present invention is an electrolyte system with high lithium ion concentration and has high concentration of cation and anion. A high number of the migrated lithium ions will facilitate the quick migration of lithium ions, thereby facilitating the lithium deposition on the negative electrode surface. Meanwhile, the electrolyte system with high lithium concentration has a high viscosity, effectively avoiding the generation of the metal lithium crystals induced by the uneven deposition of the metal lithium (high lithium ion concentration facilitates the even growth of the negative metal lithium and also helps to reduce the space charge layer in the surface of the metal lithium negative electrode, thereby reducing the electric field that drives the uneven deposition of the metal lithium; high viscosity system increases the resistance to the lithium crystals growth to some extent), making the metal lithium deposited on the negative electrode metal foil materials grow evenly and densely and the stability and safety of the lithium battery is significantly improved.

As a preferable embodiment of the lithium battery of the present invention, the positive current collector is the aluminum foil with 12~25 μm thickness.

As a preferable embodiment of the lithium battery of the present invention, the positive electrode active material is a lithium-intercalated compound which lithium ions can be reversibly inserted in and extracted from. As a more preferred embodiment of the lithium battery of the present invention, the positive electrode active material is at least one selected from the group consisting of lithium cobaltate, lithium manganate, nickel cobalt lithium manganate, lithium iron phosphate, lithium-rich multiple component material. The positive electrode active material is preferred but not limited to at least one selected from the group consisting of lithium cobaltate, lithium manganate, nickel cobalt lithium manganate, lithium iron phosphate, lithium-rich multiple component material. Those skilled in the art can also select other lithium-intercalated compounds which lithium ions can be reversibly inserted in and extracted from as the positive electrode active material if needed.

As a preferable embodiment of the lithium battery of the present invention, the metal foil is aluminum foil, tin foil, nickel foil, or copper foil, and the metal mesh is aluminum mesh, tin mesh, nickel mesh, or copper mesh. The negative electrode current collector substrate is preferred, but not limited, to be chosen from aluminum foil, tin foil, nickel foil, copper foil, aluminum mesh, tin mesh, nickel mesh, or copper mesh. Those skilled in the art can also select another metal foil or metal mesh as the negative electrode current collector substrate.

As a preferable embodiment of the lithium battery of the present invention, the separator is polypropylene/polyethylene/polypropylene triple-layered separator, polypropylene single-layered separator, polyethylene single-layered separator, or polyethylene or polypropylene separator with a surface coated with metal oxide.

As a preferable embodiment of the lithium battery of the present invention, the electrolyte comprises solvents of ethylene carbonate, ethyl methyl carbonate, dimethyl carbonate and an additive.

As a preferable embodiment of the lithium battery of the present invention, the mass ratio of ethylene carbonate:ethyl methyl carbonate:dimethyl carbonate is 1:1:1.

As a preferable embodiment of the lithium battery of the present invention, the additive is at least one selected from the group consisting of dimethyl methylphosphonate and diethyl ethylphosphonate. When the additive is at least one selected from the group consisting of dimethyl methylphosphonate and diethyl ethylphosphonate, the electrolyte of the lithium battery of the present invention contains flame-retardant solvent and the safety of the battery is effectively improved. When the electrolyte is a difunctional high lithium-salt concentration electrolyte system containing flame retardant solvent, the two problems of quick migration of the lithium ion and stabilizing the negative electrode lithium coating are solved at the same time.

As a preferable embodiment of the lithium battery of the present invention, the additive accounts for 5-25% by weight of the total mass of the solvents. When the content of the additive is too low, there will be little flame-retarding effect. The inventor has come to a conclusion through a lot of experiments that the content of the additive is preferably 5-25% by weight of the total mass of the solvents and it will help to improve the safety performance of the battery.

Meanwhile, another object of the present invention is providing a preparation method of the lithium battery. To achieve this object, the present invention employs a preparation method of the lithium battery, comprising the following steps:

(1) preparation of the positive electrode plate: positive electrode active material is made into positive electrode slurry and the slurry is coated uniformly onto the positive electrode collector to obtain the positive electrode collector attached with a positive electrode active material-containing positive electrode layer; the positive electrode collector attached with the positive electrode plate is cold pressed and cut, and then the positive electrode tab is welded onto the positive electrode collector to obtain the positive electrode plate;

(2) preparation of the negative electrode current collector substrate: the negative electrode tab is welded onto the negative electrode current collector to obtain the negative electrode current collector substrate;

(3) preparation of the separator: the separator is cut according to a certain length and width;

(4) preparation of the electrolyte: the lithium salt is added to the solvent to obtain the electrolyte;

(5) preparation of the lithium battery: a lithium battery core is made from the positive electrode plate, the separator and the negative electrode current collector substrate together; the battery core is put into packing shell; then the electrolyte is injected into the packing shell and the packing shell is sealed;

(6) formation and aging of the lithium battery: the battery made in the step (5) is subjected to formation and aging to prior to molding to obtain the final product.

As a preferable embodiment of the lithium battery of the present invention, in the step (1), the positive electrode slurry is prepared by stirring the positive electrode active material, polyvinylidene fluoride (PVDF) adhesives and conductive carbon in N-methylpyrrolidone solvent uniformly.

As a preferable embodiment of the lithium battery of the present invention, in the step (5), the lithium battery core is made from the positive electrode plate, the separator and the negative electrode current collector substrate by a laminating or winding process. Preferably, the lithium battery core is made from the positive electrode plate, the separator and the negative electrode current collector substrate by a laminating or winding process wherein the structure of the lithium battery core and the laminating or winding process are the same as those in the prior art.

As a preferable embodiment of the lithium battery of the present invention, in the step (6), the formation and aging procedure of the lithium battery is to charge the battery to 4.0V with a 0.05~0.2 C current and then to 4.2 V with a 0.2~1 C current and to perform aging in 40~50° C. environment for 24~72 h. In the preparation method of the lithium battery of the present invention, the lithium battery is to charge the battery to 4.0V with a 0.05~0.2 C current and then to 4.2 V with a 0.2~1 C current. The low charging current causes the slow disposition of the $Li^+$ extracted from the positive electrode material on the negative electrode current collector copper foil to form a uniform and dense lithium coating, improving the safety of the battery.

Furthermore, another object of the present invention is to provide use of the above lithium battery in electronic devices. The lithium battery of the present invention has characteristics of high power, high energy and low self-discharging rate. It can fulfill the developing need of the electronic devices and can be widely applied in electronic devices. For example, the use of the lithium battery in the present invention is preferably but not limited to the battery of electronic cigarette. The use of the present invention is only an example and not limited thereto.

One of the differences between the lithium battery of the present invention and conventional lithium-ion battery lies in that the negative electrode of the lithium battery of the invention is a current collector having a planar or concavo-convex structure, which is plated with a metal lithium layer on the surface. Specifically, the negative current collector is coated with a thin and dense metal lithium coating in the manner of plating during the charging and the metal lithium embeds in the positive electrode material in the form of $Li^+$ during the discharging process. Meanwhile, the metal foil material or metal mesh with a planar or concavo-convex structure will provide a space for the current collector to stretch and also provide an electrolyte-reserved space, avoiding the breakage of the positive and negative electrode current collectors induced by lithium-plating volume expansion of negative electrode current collector and also the planar or concavo-convex structure will increase the reserved volume of the electrolyte. The second difference compared with the conventional lithium-ion battery lies in that, the electrolyte is an electrolyte system with high lithium ion concentration and has high concentration of cation and anion. A high number of the migrated lithium ions will facilitate the quick migration of lithium ions and solve the problem of the quick migration of the metal lithium. Meanwhile, the electrolyte system with high lithium concentration has a high viscosity, effectively avoiding the generation of the metal lithium crystals induced by the uneven deposition of the metal lithium (high lithium ion concentration facilitates the even growth of the negative metal lithium and also helps to reduce the space charge layer in the surface of the metal lithium negative electrode, thereby reducing the electric field that drives the uneven deposition of the metal lithium; high viscosity system increases the resistance to the lithium crystals growth to some extent), making the metal lithium deposited on the negative electrode metal foil materials grow evenly and densely and the stability and safety of the lithium battery is significantly improved.

Compared with the prior art, the lithium battery of the present invention has the following advantages:

(1) high energy density: the negative current collector in the core structure of the lithium battery of the present invention is the metal foil material with 6-25 μmm thickness, which saves the space for the lithium battery, being able to increase the loading capacity of the positive electrode and thereby increasing the energy density of the lithium battery;

(2) high power density: the lithium battery of the present invention using the manner of plating, during the charging, the $Li^+$ escapes from the positive electrode and deposits on the negative current collector to form a thin layer of lithium. Based on the manner of metal foil material being used as the current collector and of lithium deposition, not only the tension strength of the electrode plate is increased, but also the movement of lithium ion is faster, thereby the power density is increased; (3) high safety: for the conventional low-salt electrolyte solution, during the charging, $Li^+$ escaping from the positive electrode deposits on the negative electrode and form a porous and loose lithium coating, or lithium crystals which is easy to penetrate the separator to induce a short circuit. In the present invention, the electrolyte is a difunctional high lithium-salt concentration electrolyte system supplemented with flame retarding solvent. It is highly viscous, effectively avoiding the generation of metal lithium crystal induced by uneven lithium deposition, making the metal lithium deposited on the negative electrode metal foil materials grow evenly and densely, and greatly improving the stability and safety of the lithium battery. Meanwhile, the negative electrode is the metal foil material or metal mesh with a planar or concavo-convex structure, which may provide a space for the current collector to stretch, and avoid the breakage of the positive and negative electrode current collectors induced by lithium-plating volume expansion the negative electrode current collector, thereby significantly improving the safety of the lithium battery; and (4) low self-discharge rate: the lithium battery in the present invention has a similar structure as primary battery and has an extremely low self-discharge rate.

The preparation method of the lithium battery according to the present invention is simple and convenient to operate, and can prepare a lithium battery having the characteristics of both high energy of primary lithium battery and high power of the rechargeable lithium battery, thereby the energy density and power density is significantly increased and the self-discharge rate is extremely low. The lithium battery of the present invention has characteristics of high power, high energy and low self-discharge rate. It fulfills the continuously upgrading need of the electronic devices and can be widely applied in electronic devices.

SPECIFIC DESCRIPTION

For better illustrating the objects, the technical solutions and advantages of the present invention, the present invention is further described referring to the drawings as follows.

Example 1

One example of the lithium battery of the present invention, wherein the lithium battery of the example is prepared according to the following method:

(1) Preparation of the positive electrode plate: lithium cobalt oxide ($LiCoO_2$) with a capacity per gram of 140 mAh/g is used as the positive electrode active material and mixed with adhesive PVDF and conductive agent Super-P in the mass ratio of 95:2:3 in NMP uniformly to prepare the positive electrode slurry. The positive electrode slurry is coated at the density of 33.0 mg/cm² on both sides of an aluminum foil with 168 mm length and 16 μm thickness. The positive electrode slurry coated on the aluminum foil has 130 mm and 152 mm lengths on the sides, respectively. The aluminum foil is cold pressed and cut into electrode plates with 42 mm length and 0.107 mm thickness; the positive electrode tab is welded on the plate to get the positive electrode plate attached with a positive electrode layer on the surface.

Figure 1:
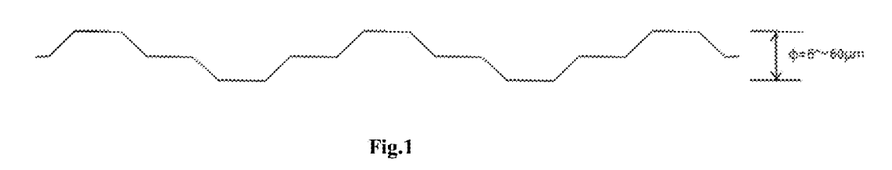
FIG. 1 shows a cross section structure diagram of one example of the negative electrode current collector substrate in the lithium battery of the present invention.

(2) Preparation of the negative electrode current collector substrate: a copper foil with 9 μm thickness is cut into foils with 153 mm length and 44 mm width. The foils are formed into the negative current collector with 20 μm thickness having a concavo-convex structure by rolling press or modeling press, the structure being as illustrated in FIG. 1; the negative electrode tab is welded onto the negative electrode current collector to get the negative electrode current collector substrate.

(3) Preparation of the separator: polypropylene/polyethylene/polypropylene triple-layered separator with 16 μm thicknesses used, wherein the length is 320 mm and the width is 46 mm.

(4) Preparation of the electrolyte: lithium hexafluorophosphate ($LiPF_6$) is added to the solvent and mixed uniformly to obtain the electrolyte, wherein the solvent is the mixture of ethylene carbonate (EC), ethyl methyl carbonate (EMC), dimethyl carbonate (DMC) and dimethyl methylphosphonate (DMMP), the mass ratio of ethylene carbonate (EC), ethyl methyl carbonate (EMC) and dimethyl carbonate (DMC) is EC:EMC:DMC=1:1:1, the mass of dimethyl methylphosphonate (DMMP) accounts for 10% by weight of the total solvent, and the concentration of $LiPF_6$ in the electrolyte is 5 mol/L.

(5) Preparation of the lithium battery: the positive electrode plate, the separator and the negative electrode current collector substrate obtained as above are wound to obtain the lithium battery core. Then the battery core is put into a plastic-aluminum packing and the electrolyte is injected prior to sealing.

(6) Formation and aging of the lithium battery: the lithium battery obtained from the step (5) is charged to 4.0V at 13 mA (0.05 C) current and then to 4.2 V at 52 mA (0.2 C) current. Then the lithium battery is put into an oven set to 45° C. for aging. After 48 hours, the lithium battery with model No. 68500 of Example 1 of the present invention is formed.

Example 2

One example of the present invention lithium battery, wherein the lithium battery of the present invention is prepared according to the following methods:

(1) Preparation of the positive electrode plate: The positive electrode active material $LiNi_{0.4}Co_{0.2}Mn_{0.4}O_2$ with a capacity per gram of 146 mAh/g is used as the positive electrode active material and mixed uniformly with adhesive PVDF and conductive agent Super-P in the mass ratio of 94.5:2:3.5 in NMP to prepare the positive electrode slurry. The positive electrode slurry is coated at the density of 30.0 mg/cm² on both sides of an aluminum foil with 168 mm length and 16 μm thickness. The positive electrode slurry coated on the aluminum foil has 130 mm and 152 mm lengths on the sides, respectively. The aluminum foil is cold pressed and cut into electrode plates with 42 mm length and 0.107 mm thickness; the positive electrode tab is welded on the plate to get the positive electrode plate attached with a positive electrode layer on the surface.

Figure 2:
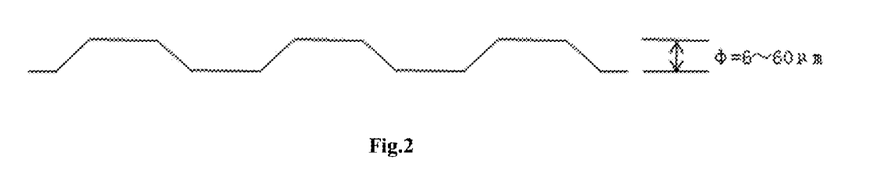
FIG. 2 shows a cross section structure diagram of another embodiment of the negative electrode current collector substrate in the lithium battery of the present invention.

(2) Preparation of the negative electrode current collector substrate: a tin foil with 9 μm thickness is cut into foils with 153 mm length and 44 mm width. The foils are formed into the negative current collector with 25 μm thickness having a concavo-convex structure by rolling press or modeling press, the structure being as illustrated in FIG. 2; the negative electrode tab is welded onto the negative electrode current collector to get the negative electrode current collector substrate.

(3) Preparation of the separator: polypropylene/polyethylene/polypropylene triple-layered separator with 16 μm thickness is used, wherein the length is 320 mm and the width is 46 mm.

(4) Preparation of the electrolyte: lithium hexafluorophosphate ($LiPF_6$) is added to the solvent and mixed uniformly to obtain the electrolyte, wherein the solvent is the mixture of ethylene carbonate (EC), ethyl methyl carbonate (EMC) and dimethyl carbonate (DMC) and diethyl ethylphosphonate (DEEP), the mass ratio of ethylene carbonate (EC), ethyl methyl carbonate (EMC) and dimethyl carbonate (DMC) is EC:EMC:DMC=1:1:1, the mass of diethyl ethylphosphonate (DEEP) accounts for 5% by weight of the total solvent, and the concentration of $LiPF_6$ in the electrolyte is 7 mol/L.

(5) Preparation of the lithium battery: the positive electrode plate, the separator and the negative electrode current collector substrate obtained as above are wound to obtain the lithium battery core. Then the battery core is put into a plastic-aluminum packing shell and the electrolyte is injected prior to sealing.

(6) Formation and aging of the lithium battery: the lithium battery obtained from the step (5) is charged to 4.0V at 50 mA (0.2 C) current and then to 4.2 V at 250 mA (1 C). And the lithium battery is put into the 50° C. oven for aging. Then the lithium battery is put into an oven set to 50° C. for aging.

After 36 hours, the lithium battery with model No. 68500 of Example 2 of the present invention is formed.

Example 3

One example of the lithium battery of the present invention, wherein the lithium battery of the example is prepared in the following method:
(1) Preparation of the positive electrode plate: lithium manganese (LiMnO$_2$) with a capacity per gram of 100 mAh/g is used as the positive electrode active material and mixed with adhesive PVDF and conductive agent Super-P at the mass ratio of 94.5:2:3.5 in NMP uniformly to prepare the positive electrode slurry. The positive electrode slurry is coated at the density of 27.0 mg/cm$^2$ on both sides of an aluminum foil with 168 mm length and 16 μm thickness. The positive electrode slurry coated on the aluminum foil has 130 mm and 152 mm lengths on the sides, respectively. The aluminum foil is cold pressed and cut into electrode plates with 42 mm length and 0.102 mm thickness; the positive electrode tab is welded on the plate to get the positive electrode plate attached with a positive electrode layer on the surface.
(2) Preparation of the negative electrode current collector substrate: an aluminum foil with 16 μm thickness is cut into foils with 153 mm length and 44 mm width. The foils are formed into the negative current collector with 50 μm thickness having a concavo-convex structure by winding press or modeling press, the structure being as illustrated in FIG. 1; the negative electrode tab is welded onto the negative electrode current collector to get the negative electrode current collector substrate.
(3) Preparation of the separator: polypropylene/polyethylene/polypropylene triple-layered separator with 16 μm thickness is used, wherein the length is 320 mm and the width is 46 mm.
(4) Preparation of the electrolyte: lithiumhexafluorophosphate (LiPF$_6$) is added to the solvent and mixed uniformly to obtain the electrolyte, wherein the solvent is the mixture of ethylene carbonate (EC), ethyl methyl carbonate (EMC), dimethyl carbonate (DMC), dimethyl methylphosphonate (DMMP) and diethyl ethylphosphonate (DEEP), the mass ratio of ethylene carbonate (EC), ethyl methyl carbonate (EMC) and dimethyl carbonate (DMC) is EC:EMC:DMC=1:1:1, the mass of dimethyl methylphosphonate (DMMP) and diethyl ethylphosphonate (DEEP) account for 20% by weight of the total solvent, and the concentration of LiPF$_6$ in the electrolyte is 1.5 mol/L.
(5) Preparation of the lithium battery: the positive electrode plate, the separator and the negative electrode current collector substrate obtained as above are wound to obtain the lithium battery core. Then the battery core is put into a plastic-aluminum packing shell and the electrolyte is injected prior to sealing.
(6) Formation and aging of the lithium battery: The lithium battery obtained from the step (5) is charged to 4.0V at 15 mA (0.1 C) current and then to 4.2 V at 75 mA (0.5 C) current. Then the lithium battery is put into an oven set to 40° C. for aging. After 72 hours, the lithium battery of Example 3 of the present invention is formed.

Example 4

One example of the lithium battery of the present invention, wherein the lithium battery of the example is prepared in the following method:
(1) Preparation of the positive electrode plate: lithium cobalt oxide (LiCoO$_2$) with a capacity per gram of 140 mAh/g, and lithium manganese (LiMnO$_2$) with a capacity per gram of 100 mAh/g are used as the positive electrode active material and mixed with adhesive PVDF and conductive agent Super-P at the mass ratio of 95:2:3 in NMP uniformly to prepare the positive electrode slurry. The slurry positive electrode is coated at the density of 28.0 mg/cm$^2$ on both sides of an aluminum foil with 168 mm length and 16 μm thickness. The positive electrode slurry coated on the aluminum foil has 130 mm and 152 mm lengths on the sides, respectively. The aluminum foil is cold pressed and cut into electrode plates with 42 mm length and 0.102 mm thickness; the positive electrode tab is welded on the plate to get the positive electrode plate attached with a positive electrode layer on the surface.
(2) Preparation of the negative electrode current collector substrate: a nickel mesh with 16 μm thickness is cut into meshes with 153 mm length and 44 mm width. The meshes are formed into the negative current collector with 60 μm thickness having a concavo-convex structure by rolling press or modeling press, the structure being as illustrated in FIG. 2; the negative electrode tab is welded onto the negative electrode current collector to get the negative electrode current collector substrate.
(3) Preparation of the separator: polypropylene/polyethylene/polypropylene triple-layered separator with 12 μm thickness is used, wherein the length is 320 mm and the width is 46 mm.
(4) Preparation of the electrolyte: lithiumhexafluorophosphate (LiPF$_6$) is added to the solvent and mixed uniformly to obtain the electrolyte, wherein the solvent is the mixture of ethylene carbonate (EC), ethyl methyl carbonate (EMC), dimethyl carbonate (DMC), dimethyl methylphosphonate (DMMP) and diethyl ethylphosphonate (DEEP), the mass ratio of ethylene carbonate (EC), ethyl methyl carbonate (EMC) and dimethyl carbonate (DMC) is EC:EMC:DMC=1:1:1, the mass of dimethyl methylphosphonate (DMMP) and diethyl ethylphosphonate (DEEP) account for 25% by weight of the total solvent, and the concentration of LiPF$_6$ in the electrolyte is 4 mol/L.
(5) Preparation of the lithium battery: the positive electrode plate, the separator and the negative electrode current collector substrate obtained as above are wound to obtain the lithium battery core. Then the battery core is put into a plastic-aluminum packing shell and the electrolyte is injected prior to sealing.
(6) Formation and aging of the lithium battery: The lithium battery obtained from the step (5) is charged to 4.0V at 13 mA (0.05 C) current and then to 4.2 V at 52 mA (0.2 C) current. Then the lithium battery is put into a oven set to 48° C. for aging. After 24 hours, the lithium battery of Example 4 of the present invention is formed.

Example 5

One example of the lithium battery of the present invention, wherein the lithium battery of the example is prepared in the following method:
(1) Preparation of the positive electrode plate: LiNi$_{0.4}$Co$_{0.2}$Mn$_{0.4}$O$_2$ with a capacity per gram of 146 mAh/g is used as the positive electrode active material and mixed with adhesive PVDF and conductive agent Super-P at the mass ratio of 95:2:3 in NMP uniformly to prepare the positive electrode slurry. The positive electrode slurry is coated at the density of 32.0 mg/cm$^2$ on both sides of the aluminum foil with 168 mm length and 16 μm thickness. The positive electrode slurry coated on the aluminum foil has 130 mm and 152 mm lengths on the sides, respectively. The aluminum foil is cold pressed and cut into electrode plates with 42 mm length and 0.107 mm thickness; the positive electrode tab is welded on the plate to get the positive electrode plate attached with a positive electrode layer on the surface.

(2) Preparation of the negative electrode current collector substrate: an aluminum mesh with 6 μm thickness is cut into the meshes with 153 mm length and 44 mm width. The negative current collector formed in this example is an aluminum mesh with 6 μm thickness having a planar structure; the negative electrode tab is welded onto the negative electrode current collector to get the negative electrode current collector substrate.

(3) Preparation of the separator: polypropylene/polyethylene/polypropylene triple-layered separator with 12 μm thickness is used, wherein the length is 320 mm and the width is 46 mm.

(4) Preparation of the electrolyte: lithium hexafluorophosphate ($LiPF_6$) is added to the solvent and mixed uniformly to obtain the electrolyte, wherein the solvent is the mixture of ethylene carbonate (EC), ethyl methyl carbonate (EMC), dimethyl carbonate (DMC) and dimethyl methylphosphonate (DMMP), the mass ratio of ethylene carbonate (EC), ethyl methyl carbonate (EMC) and dimethyl carbonate (DMC) is EC:EMC:DMC=1:1:1, the mass of dimethyl methylphosphonate (DMMP) accounts for 15% by weight of the total solvent, and the concentration of $LiPF_6$ in the electrolyte is 6 mol/L.

(5) Preparation of the lithium battery: the positive electrode plate, the separator and the negative electrode current collector substrate obtained as above are wound to obtain the lithium battery core. Then the battery core is put into a plastic-aluminum packing shell and the electrolyte is injected prior to sealing.

(6) Formation and aging of the lithium battery: The lithium battery obtained from the step (5) is charged to 4.0V at 50 mA (0.2 C) current and then to 4.2 V at 250 mA (1 C) current. Then the lithium battery is put into a oven set to 42° C. for aging. After 60 hours, the lithium battery of Example 5 of the present invention is formed.

Comparative Example 1

One comparative example of the lithium battery of the present invention, wherein the lithium battery of the present comparative example is prepared according to the following method:

(1) Preparation of the positive electrode plate: manganese dioxide ($MnO_2$) with a capacity per gram of 140 mAh/g, is used as the positive electrode active material and mixed with adhesive PVDF and conductive agent Super-P at the mass ratio of 95:2:3 in NMP uniformly to prepare the positive electrode slurry. The positive electrode slurry is coated at the density of 33.0 mg/cm² on both sides of an aluminum foil with 168 mm length and 16 μm thickness. The positive electrode slurry coated on the aluminum foil has 82 mm and 100 mm lengths on the sides, respectively. The aluminum foil is cold pressed and cut into electrode plates with 42 mm length and 0.093 mm thickness; the positive electrode tab is welded on the plate to get the positive electrode plate attached with a positive electrode layer on the surface.

(2) Preparation of the negative electrode current collector substrate: graphite with a capacity per gram of 350 mAh/g is used as the negative electrode active material and mixed with adhesive styrene-butadiene rubber (SBR), thickener carboxymethylcellulose (CMC) and conductive agent Super-P at the mass ratio of 95:1.8:1.5:1.7 in deionized water uniformly to prepare the negative electrode slurry. The negative electrode slurry is coated at the density of 12.4 mg/cm² on both sides of a copper foil with 105 mm length and 9 μm thickness. The negative electrode slurry coated on the copper foil has 100 mm lengths on the both sides. The copper foil is cold pressed and cut into electrode plates with 44 mm length and 0.09 mm thickness. The negative electrode tab is welded to the plate to get the negative electrode plate attached with a negative electrode layer on the surface.

(3) Preparation of the separator: polypropylene/polyethylene/polypropylene triple-layered separator with 16 μm thickness is used, wherein the length is 320 mm and the width is 46 mm.

(4) Preparation of the electrolyte: lithium hexafluorophosphate ($LiPF_6$) is added to the solvent and mixed uniformly to obtain the electrolyte, wherein the solvent is the mixture of ethylene carbonate (EC), ethyl methyl carbonate (EMC) and dimethyl carbonate (DMC), the mass ratio of ethylene carbonate (EC), ethyl methyl carbonate (EMC) and dimethyl carbonate (DMC) is EC:EMC:DMC=1:1:1, and the concentration of $LiPF_6$ in the electrolyte is 1 mol/L.

(5) Preparation of the lithium battery: the positive electrode plate, the separator and the negative electrode plate obtained as above are wound to obtain the lithium battery core. Then the battery core is put into a plastic-aluminum packing shell and the electrolyte is injected prior to sealing.

(6) Formation and aging of the lithium battery: the lithium battery obtained from the step (5) is charged to 4.0V at 13 mA (0.05 C) current and then to 4.2 V at 52 mA (0.4 C) current. The lithium battery with model No. 68500 of Comparative Example 1 of the present invention is obtained after formation.

Comparative Example 2

One comparative example of the lithium battery of the present invention, wherein the lithium battery of the comparative example is prepared according to the following method:

(1) Preparation of the positive electrode plate: manganese dioxide ($MnO_2$) with a capacity per gram of 270 mAh/g is used as the positive electrode active material and mixed with adhesive PVDF and conductive agents Super-P and KS-6 at the mass ratio of 90:3:3.5:3.5 in NMP uniformly to prepare the positive electrode slurry. The positive electrode slurry is coated at the density of 28.0 mg/cm² on both sides of an aluminum foil with 120 mm length and 16 μm thickness. The positive electrode slurry coated on the aluminum foil has 82 mm and 100 mm lengths on the sides, respectively. The aluminum foil is cold pressed and cut into electrode plates with 44 mm length and 0.108 mm thickness; the positive electrode tab is welded on the plate to get the positive electrode plate attached with a positive electrode layer on the surface.

(2) Preparation of the negative electrode plate: a lithium ribbon with 42 mm width and 0.07 mm thickness is cut into lithium ribbons with 95 mm length. The negative tabs are pressed onto the lithium ribbons to get the negative electrode plates.

(3) Preparation of the separator: polypropylene/polyethylene/polypropylene triple-layered separator with 16 μm thickness is used, wherein the length is 320 mm and the width is 46 mm.

(4) Preparation of the electrolyte: lithium hexafluorophosphate ($LiPF_6$) is added to the solvent and mixed uniformly to obtain the electrolyte, wherein the solvent is the mixture of comprises ethylene carbonate (EC), ethyl methyl carbonate (EMC) and dimethyl carbonate (DMC), the mass ratio of ethylene carbonate (EC), ethyl methyl carbonate (EMC) and dimethyl carbonate (DMC) is EC:EMC:DMC=1:1:1, and the concentration of $LiPF_6$ in the electrolyte is 1 mol/L.

(5) Preparation of the lithium battery: the positive electrode plate, the separator and the negative electrode plate obtained as above are wound to obtain the lithium battery core. Then the battery core is put into a plastic-aluminum packing shell and the electrolyte is injected prior to sealing.

(6) Formation and aging of the lithium battery: The lithium battery obtained from the step (5) is discharged for 12 min (1% capacity) at 13 mA (0.05 C). And the lithium battery is put into an oven set to 45° C. for aging. After 48 hours, the lithium battery with a model No. 68500 of Comparative Example 2 of the present invention is formed.

Example 6

The lithium batteries prepared in Examples 1-5 are discharged at 100 mA and 1000 mA, respectively. The discharging capacities and the plateau voltages are shown in Table 1:

TABLE 1

| Groups | Discharging cut-off voltages | 1000 mA discharging median voltages | 1000 mA discharging capacities | 100 mA discharging median voltages | 100 mA discharging capacities |
|---|---|---|---|---|---|
| Example 1 | 3.0 V | 3.754 V | 243.8 mAh | 3.907 V | 258.9 mAh |
| Example 2 | 3.0 V | 3.566 V | 225.9 mAh | 3.785 V | 248.2 mAh |
| Example 3 | 3.0 V | 3.766 V | 136.9 mAh | 3.895 V | 148.0 mAh |
| Example 4 | 3.0 V | 3.826 V | 245.7 mAh | 3.951 V | 261.7 mAh |
| Example 5 | 3.0 V | 3.592 V | 227.4 mAh | 3.801 V | 251.6 mAh |

The lithium batteries prepared in Example 1, Comparative Example 1 and Comparative Example 2 are discharged at 100 mA and 1000 mA, respectively. The discharging capacities, the plateau voltage and the self-discharging rates are illustrated in Table 2:

TABLE 2

| Groups | Discharging cut-off voltages | 1000 mA discharging median voltages | 1000 mA discharging capacities | 100 mA discharging median voltages | 100 mA discharging-capacities | self-discharging rates |
|---|---|---|---|---|---|---|
| embodiment 1 | 3.0 V | 3.754 V | 243.8 mAh | 3.907 V | 258.9 mAh | 3%/year |
| Comparative Example 1 | 3.0 V | 3.546 V | 136.1 mAh | 3.758 V | 141.0 mAh | 20%/year |
| Comparative Example 2 | 2.0 V | 2.453 V | 149.9 mAh | 2.690 V | 204.4 mAh | 2%/year |

Figure 3:
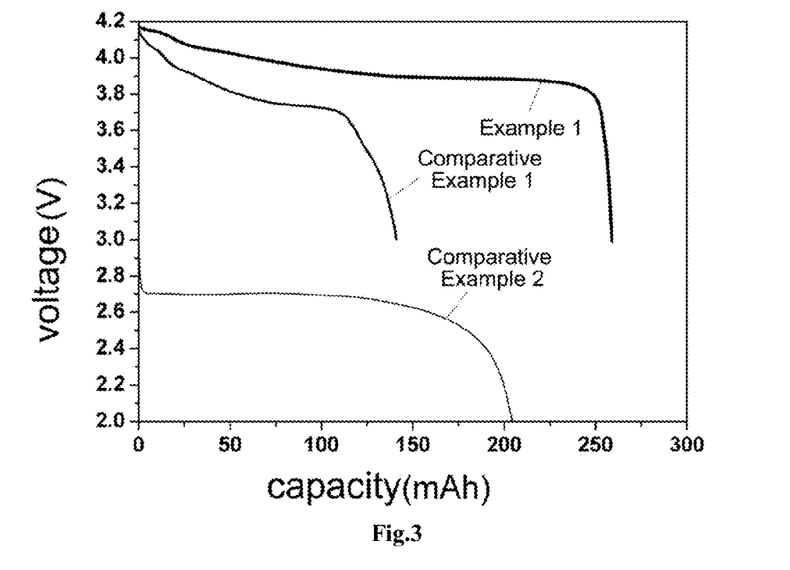
FIG. 3 shows a comparison diagram of discharging curves at 100 mA of the lithium batteries of example 1, comparative example 1 and comparative example 2 of the present invention.
Figure 4:
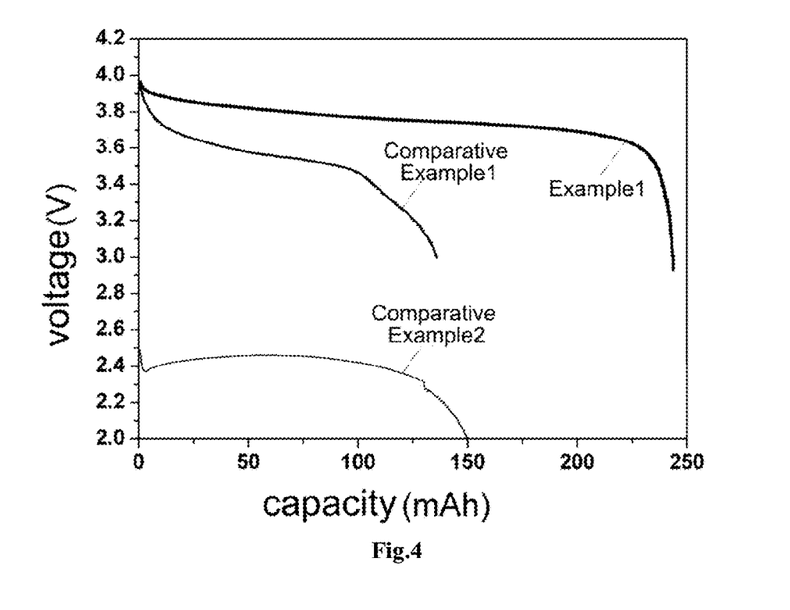
FIG. 4 shows a comparison diagram of discharging curves at 1000 mA of the lithium batteries of example 1, comparative example 1 and comparative example 2 of the present invention.

Discharging curves of the lithium batteries prepared in Example 1, Comparative Example 1 and Comparative Example 2 at 100 mA and 1000 mA are shown in FIG. 3 and FIG. 4, respectively. According to Example 1, Comparative Example 1 and Comparative Example 2, the battery models are selected to calculate the volume specific energy of the batteries of Example 1, Comparative Example 1 and Comparative Example 2, as shown in FIG. 5.

Figure 5:
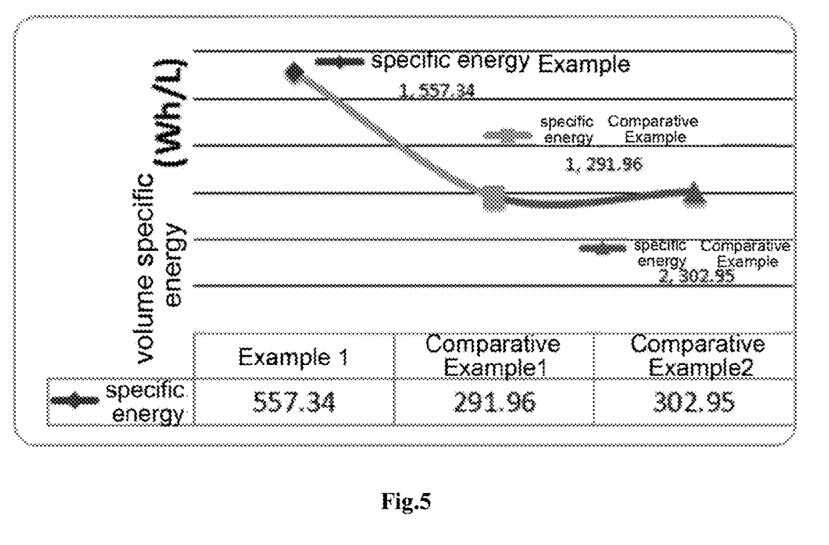
FIG. 5 shows a comparison diagram of volume specific energy of lithium batteries of example 1, comparative example 1 and comparative example 2 of the present invention.

As can be seen from the data of Tables 1 and 2 and FIGS. 3-5, in comparison with the lithium ion battery in Example 1 and the primary lithium battery in Comparative Example 1, the lithium battery of the present invention has the characteristics of both high energy of primary lithium battery and high power of the lithium ion battery; during the charging, the lithium ions escaping from the positive electrode material deposits on the negative current collector surface and forms a thin metal lithium coating, thereby the power density is increased and meanwhile, the battery space is saved to increase the volume-energy density of the battery for the negative electrode does not need to be coated with a layer. In addition, the electrolyte of the present invention is a difunctional high lithium-salt concentration electrolyte system containing flame retarding solvent, solving the two problems of fast migration of lithium ion and stabilizing the negative electrode lithium coating at the same time. The lithium battery prepared by the method of the present invention combines the characteristics of both high energy of primary lithium battery and high power of the lithium ion battery, significantly improving the energy density and power density of the battery and having extremely low self-discharging rate, thus can be used as a primary battery or a lithium ion battery with low cycle requirement.

Finally, it should be noted that the above examples are merely used for explaining the technical solution of the present invention but not constitute a limitation for the protection scope of the present invention. Although the invention has been described in details referring to some preferable examples, the ordinary skilled people in the present field should understand that the technical solution of the present invention can be modified or replaced with equivalents without departing from the spirit and scope of the present invention.

The invention claimed is:

1. A lithium battery, which comprises a positive electrode plate, a negative electrode current collector substrate, a separator, and an electrolyte between the positive electrode plate and the negative electrode current collector substrate, wherein, the positive electrode plate comprises a positive electrode collector, a positive electrode active material-containing positive electrode layer attached to the positive electrode collector and a positive electrode tab welded to the positive electrode collector;

the negative electrode current collector substrate comprises a negative electrode current collector and a negative electrode tab welded to the negative electrode current collector;

the negative electrode current collector substrate is a current collector substrate with a thickness not exceeding 60 μm having a concavo-convex structure which is made from metal foil material or metal mesh with 6~25 μm thickness;

and the electrolyte contains a lithium salt and solvent, the lithium salt is lithium hexafluorophosphate, and its concentration in the electrolyte is 4~7 mol/L.

2. The lithium battery according to claim 1, wherein the positive electrode collector is an aluminum foil with 12~25 μm thickness.

3. The lithium battery according to claim 1, wherein the positive electrode active material is a lithium-intercalated compound in which lithium ions can be reversibly inserted and extracted.

4. The lithium battery according to claim 3, wherein the positive electrode active material is at least one selected from the group consisting of lithium cobaltate, lithium manganate, nickel cobalt lithium manganate, lithium iron phosphate, and a lithium-rich multiple component material.

5. The lithium battery according to claim 1, wherein the metal foil material is aluminum foil, tin foil, nickel foil or copper foil and the metal mesh is aluminum mesh, tin mesh, nickel mesh or copper mesh.

6. The lithium battery according to claim 1, wherein the separator is polypropylene/polyethylene/polypropylene triple-layered separator, polypropylene single-layered separator, polyethylene single-layered separator, or polyethylene or polypropylene separator with a surface coated by metal oxide.

7. The lithium battery according to claim 1, wherein the electrolyte comprises solvents of ethylene carbonate, ethyl methyl carbonate, dimethyl carbonate and an additive.

8. The lithium battery according to claim 7, wherein the mass ratio of ethylene carbonate:ethyl methyl carbonate:dimethyl carbonate is 1:1:1.

9. The lithium battery according to claim 7, wherein the additive is at least one selected from the group consisting of dimethyl methylphosphonate and diethyl ethylphosphonate.

10. The lithium battery according to claim 7, wherein the additive accounts for 5-25% by weight of the total mass of the solvents.

11. A method of preparing a lithium battery, comprising the following steps:
(1) a step of preparing a positive electrode plate, wherein positive electrode active material is made into a positive electrode slurry and the slurry is coated uniformly onto a positive electrode collector to obtain the positive electrode collector coated with a positive electrode active material-containing positive electrode layer, the positive electrode collector coated with the positive electrode layer is cold pressed and cut, and, subsequently, a positive electrode tab is welded onto the positive electrode collector to obtain the positive electrode plate;
(2) a step of preparing a negative electrode current collector substrate, wherein a negative electrode tab is welded onto a negative electrode current collector to obtain the negative electrode current collector substrate and the negative electrode current collector substrate is a current collector substrate with a thickness not exceeding 60 μm having a concavo-convex structure which is made from metal foil material or metal mesh with 6~25 μm thickness;
(3) a step of preparing a separator, wherein the separator is cut to a predetermined length and width;
(4) a step of preparing an electrolyte, wherein a lithium salt is added to a solvent to obtain the electrolyte and the lithium salt has a concentration of 4~7 mol/L in the electrolyte;
(5) a step of constructing the lithium battery, wherein, a lithium battery core is assembled from the positive electrode plate, the separator, and the negative electrode current collector substrate, the battery core is inserted into a packing shell, the electrolyte is subsequently injected into the packing shell, and the packing shell is sealed; and
(6) a step of performing a formation and aging procedure, wherein the battery constructed in step (5) is charged and is subjected to aging in a heated environment.

12. The method of manufacturing a lithium battery according to claim 11, wherein in step (1), the positive electrode slurry is prepared by uniformly dispersing the positive electrode active material, polyvinylidene fluoride (PVDF) adhesives, and conductive carbon in N-methylpyrrolidone solvent.

13. The method of manufacturing a lithium battery according to claim 11, wherein in step (5), the lithium battery core is assembled from the positive electrode plate, the separator, and the negative electrode current collector substrate by laminating or winding.

14. The method of manufacturing a lithium battery according to claim 11, wherein in step (6), the formation and aging procedure comprises charging the battery to 4.0V with a 0.05~0.2 C current and then to 4.2 V with a 0.2~1 C current, and aging at 40~50° C. for 24~72 h.

15. An electronic device incorporating the battery of claim 1 as a power source.

* * * * *